United States Patent
Takei et al.

(10) Patent No.: US 8,235,357 B2
(45) Date of Patent: Aug. 7, 2012

(54) VALVE GEAR HAVING A VALVE STEM AND A VALVE BUSH

(75) Inventors: Mao Takei, Hyogo (JP); Toshinari Nishimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 292 days.

(21) Appl. No.: 12/311,427

(22) PCT Filed: May 1, 2008

(86) PCT No.: PCT/JP2008/058342
§ 371 (c)(1),
(2), (4) Date: Mar. 30, 2009

(87) PCT Pub. No.: WO2008/139950
PCT Pub. Date: Nov. 20, 2008

(65) Prior Publication Data
US 2010/0032607 A1 Feb. 11, 2010

(30) Foreign Application Priority Data

May 7, 2007 (JP) ................................. 2007-122111

(51) Int. Cl.
*F16K 51/00* (2006.01)
(52) U.S. Cl. ........................................ 251/318; 251/368
(58) Field of Classification Search .................. 251/368, 251/318
See application file for complete search history.

(56) References Cited

U.S. PATENT DOCUMENTS

| | | | |
|---|---|---|---|
| 2,339,384 A * | 1/1944 | Duckworth | 251/63.4 |
| 2,622,617 A * | 12/1952 | Sederquist | 251/14 |
| 2,786,487 A * | 3/1957 | Spence | 137/625.36 |
| 4,589,628 A | 5/1986 | Barker et al. | |
| 5,337,872 A * | 8/1994 | Kawamura et al. | 192/53.34 |
| 5,455,078 A * | 10/1995 | Kanzaki | 427/446 |
| 5,517,956 A * | 5/1996 | Jette et al. | 123/188.3 |
| 5,647,313 A * | 7/1997 | Izumida et al. | 123/90.51 |
| 6,418,620 B1 * | 7/2002 | Jackel et al. | 29/894 |
| 6,488,263 B2 * | 12/2002 | Robert | 251/214 |
| 6,793,198 B2 * | 9/2004 | Robison et al. | 251/357 |
| 6,987,437 B2 * | 1/2006 | Matsusaka et al. | 335/220 |
| 2006/0219200 A1* | 10/2006 | Horimura et al. | 123/90.51 |

FOREIGN PATENT DOCUMENTS

EP     0 105 218     4/1984
(Continued)

OTHER PUBLICATIONS

International Search Report mailed Aug. 5, 2008 for International Application No. PCT/JP2008/058342. Yong-jun Zhou et al., "Development and research status of Ni-base Superalloy", Journal of Shenyang Institute of Acronautical Engineering, vol. 23, No. 1, Feb. 28, 2006, pp. 35-37, with abstract.
Korean Office Action issued Apr. 26, 2011 in corresponding Korean Application No. 10-2009-7006291.
Chinese Office Action issued Mar. 31, 2010 in corresponding Chinese Application No. 200880000826.0.

*Primary Examiner* — John Bastianelli
(74) *Attorney, Agent, or Firm* — Wenderoth, Lind & Ponack, L.L.P.

(57) ABSTRACT

A valve gear in which corrosion due to a potential difference does not occur and which can reduce the corrosion occurrence even when loads due to microvibrations are given. The valve gear includes a valve stem and a valve bush that slidably supports the valve stem. The valve stem is formed from a forged part made of a Ni-based superalloy and the valve bush is formed from a cast part made of a Ni-based superalloy. The preferable surface roughness of a sliding surface of the valve stem in contact with the valve bush and the preferable surface roughness of a sliding surface of the valve bush in contact with the valve stem is 100 μM or less in units of Rz.

1 Claim, 3 Drawing Sheets

FOREIGN PATENT DOCUMENTS

| | | |
|---|---|---|
| EP | 0 167 869 | 1/1986 |
| JP | 59-65671 | 4/1984 |
| JP | 61-10172 | 1/1986 |
| JP | 1-28269 | 6/1989 |
| JP | 6-101769 | 4/1994 |
| JP | 2004-19918 | 1/2004 |
| JP | 2005-321061 | 11/2005 |
| JP | 2007-057055 | 3/2007 |

* cited by examiner

VALVE GEAR HAVING A VALVE STEM AND A VALVE BUSH

BACKGROUND OF THE INVENTION

I. Technical Field

The present invention relates to a valve gear and, in particular, to a valve gear capable of preventing the sticking between the valve stem of a steam valve and a valve bush supporting the valve stem.

II. Description of the Related Art

A main steam valve in a steam turbine is used under harsh conditions of high temperature and high pressure, and further takes the task of controlling high-speed steam flow. Under high temperature, the surface of a metal is in an activated state to react with the high-temperature steam present in the atmosphere to produce an oxide film. This oxide film has different adhesion strength to the base metal, depending on the composition of the base metal and the atmospheric conditions, and undergoes delamination at every repeated opening-closing movement of the valve. The delaminated matter is deposited locally in the recessed portions of the valve stem by the sliding of the valve stem so as to fill in the clearance between the valve bush and the valve stem. Consequently, the sticking of the valve stem is caused as the case may be. Accordingly, at the time of the periodic inspection of a steam turbine, it is necessary to conduct maintenance work for removing the oxide film by disassembling the members surrounding the valve stem. Additionally, the generation amount of the deposition substance is anticipated, and accordingly the clearance between the valve stem and the valve bush is set at a sufficiently large value. Therefore, the steam amount leaking from the portion surrounding the valve stem is increased to cause problems such as the decrease of the thermal efficiency of a whole plant.

A proposal for solving the problem of such the sticking is disclosed in Patent Document 1 Japanese Patent Publication No. 1-28269. Japanese Patent Publication No. 1-28269 proposes that the main body of a valve stem and a bush (hereinafter referred to as a valve bush) be formed from materials having almost the same linear expansion coefficient, that a Ni alloy be building-up welded on the outer surface of a sliding part of the valve stem, and that the building-up welded Ni alloy portion be subjected to a nitriding treatment.

According to the proposal of Japanese Patent Publication No. 1-28269, because a Ni alloy is provided on the outer surface of a sliding part of the valve stem, little oxide film is generated and hence the occurrence of sticking can be prevented. Furthermore, because the main body of the valve stem and the valve bush are formed from materials having almost the same linear expansion coefficient, it is possible to ensure the clearance between sliding parts formed between the two even when the valve is used at high temperatures.

Although Japanese Patent Publication No. 1-28269 describes that austenite stainless steels, 12% Cr-based stainless steels and low-alloy steels (Cr—Mo(—V) steels) are used in the main body of the valve stem and the valve bush, there is no specific description related to Ni alloys.

SUMMARY OF THE INVENTION

According to the proposal of Japanese Patent Publication No. 1-28269, particularly, in the building-up welding of a Ni alloy, the Ni alloy is provided only in necessary areas. Therefore, this is an effective technique because it is unnecessary to work the Ni alloy, which is a difficult-to-machine material.

However, from the standpoint of corrosion due to a potential difference, it is undesirable to use different metals in a high-temperature corrosive environment. It has been empirically clear that corrosion becomes apt to occur when a load gives a microdisplacement to a member and this displacement reaches a level that exceeds an allowable range. Therefore, it is undesirable to use building-up welding in a portion to which such a load is applied. In particular, because the valve stem undergoes microvibrations due to steam flow and a load is given to the valve bush that receives the vibrations, it is advisable to avoid the use of building-up welding in a valve gear that controls the vapor flow.

The present invention was achieved on the basis of such technical problems and has as its object to provide a valve gear in which corrosion due to a potential difference does not occur and which can reduce the corrosion occurrence even when loads due to microvibrations are given.

For the purpose of achieving such an object as described above, the present inventors conceived the idea that the corrosion due to a potential difference is prevented by forming the whole of a valve stem and a valve bush from a Ni-based superalloy and the corrosion occurrence is reduced by forming the valve bush from a cast part that easily absorbs microvibrations. That is, the valve gear of the present invention comprises a valve stem and a valve bush that slidably supports the valve stem, and is characterized in that the valve stem is formed from a forged part made of a Ni-based superalloy, and that the valve bush is formed from a cast part made of a Ni-based superalloy.

In the valve gear of the present invention, it is preferred that the surface roughness of a sliding surface of the valve stem in contact with the valve bush and the surface roughness of a sliding surface of the valve bush in contact with the valve stem be 100 μm or less in units of Rz.

As described above, according to the present invention, it is possible to prevent the occurrence of sticking and corrosion due to a potential difference by forming the whole of both of a valve stem and a valve bush from a Ni-based superalloy. Furthermore, it is possible to reduce the corrosion occurrence by forming the valve bush from a cast part that easily absorbs microvibrations.

DETAILED DESCRIPTION OF THE INVENTION

Hereinafter, the present invention is described in detail with reference to the accompanying drawings.

Figure 1:
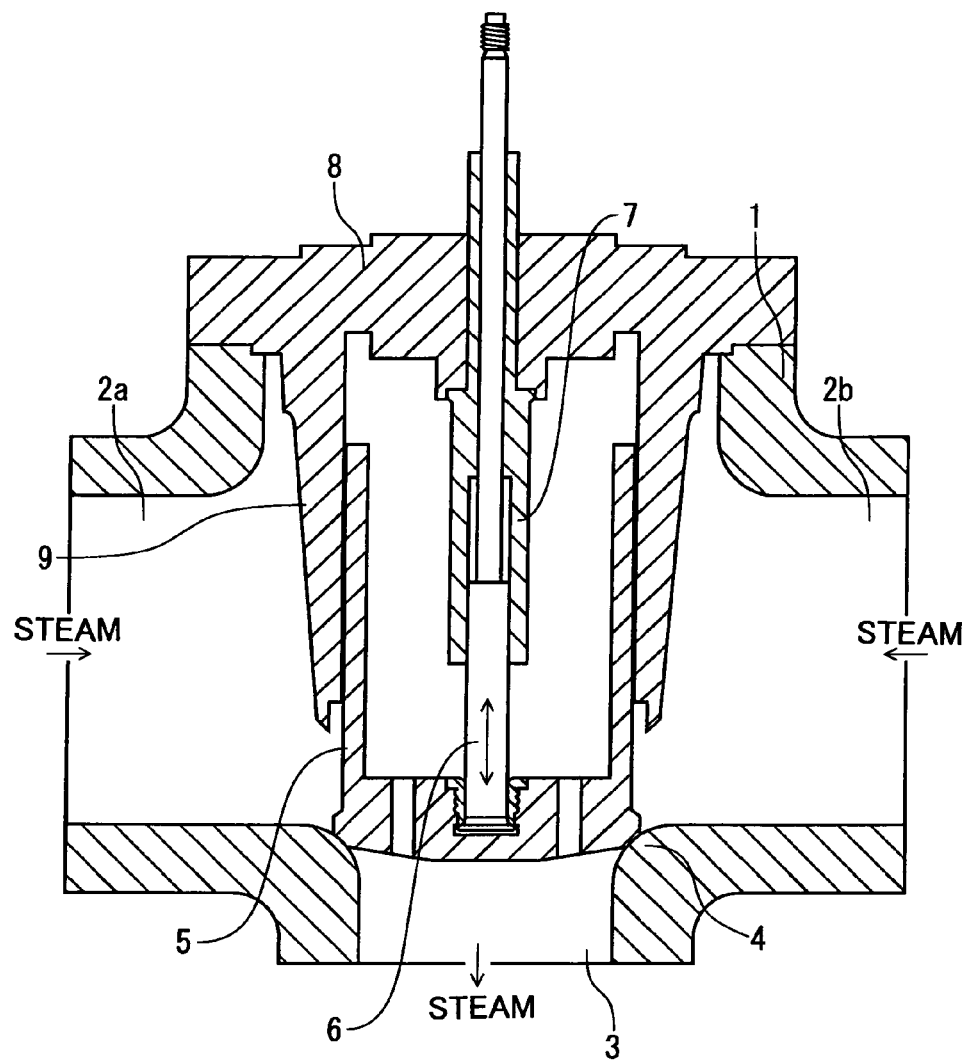
FIG. 1 is a cross-sectional view showing the construction of a steam valve in this embodiment.

FIG. 1 is a cross-sectional view showing an example of the construction of a valve gear (high-temperature steam valve, Japanese Patent Laid-Open 6-101769) to which the present invention is applied. In FIG. 1, a valve disc casing 1 has steam inlets 2a, 2b in both side portions and a single steam outlet 3 in a lower portion. A valve seat 4 is formed in the interior of the valve disc casing 1 in an inward area of this steam outlet 3. A valve disc 5 is attached so as to be able to approach or depart from this valve seat 4, and the shutoff and outflow of steam is performed by the movement of the valve disc 5. The valve stem 6 is such that one end thereof is connected to a middle portion of a lower end of the valve disc 5 and the other end thereof extends through an internal space confined by a peripheral wall of the valve disc 5, and slidably pierces in this embodiment all of the Ni-based superalloys shown in Table 1 may be used, among others NCF718 is preferable to use.

TABLE 1

| | C | Si | Mn | P | S | Ni | Cr | Fe | Mo | Cu | Al | Ti | Nb + Ta | B (wt %) |
|---|---|---|---|---|---|---|---|---|---|---|---|---|---|---|
| NCF600 | 0.15 and under | 0.50 and under | 1.00 and under | 0.030 and under | 0.015 and under | 72.00 and over | 14.00-17.00 | 6.00-10.00 | — | 0.50 and under | — | — | — | — |
| NCF601 | 0.10 and under | 0.50 and under | 1.00 and under | 0.030 and under | 0.015 and under | 58.00-63.00 | 21.00-25.00 | bal. | — | 1.00 and under | 1.00-1.70 | — | — | — |
| NCF625 | 0.10 and under | 0.50 and under | 0.50 and under | 0.015 and under | 0.015 and under | 58.00 and over | 20.00-23.00 | 5.00 and under | 8.00-10.00 | — | 0.40 and under | 0.40 and under | 3.15-4.15 | — |
| NCF690 | 0.05 and under | 0.50 and under | 0.50 and under | 0.030 and under | 0.015 and under | 58.00 and over | 27.00-31.00 | 7.00-11.00 | — | 0.50 and under | — | — | — | — |
| NCF718 | 0.08 and under | 0.35 and under | 0.35 and under | 0.015 and under | 0.015 and under | 50.00-55.00 | 17.00-21.00 | bal. | 2.80-3.30 | 0.30 and under | 0.20-0.80 | 0.65-1.15 | 4.75-5.50 | 0.006 and under |
| NCF750 | 0.08 and under | 0.50 and under | 1.00 and under | 0.030 and under | 0.015 and under | 70.00 and over | 14.00-17.00 | 5.00-9.00 | — | 0.50 and under | 0.40-1.00 | 2.25-2.75 | 0.70-1.20 | — |
| NCF751 | 0.10 and under | 0.50 and under | 1.00 and under | 0.030 and under | 0.015 and under | 70.00 and over | 14.00-17.00 | 5.00-9.00 | — | 0.50 and under | 0.90-1.50 | 2.00-2.60 | 0.70-1.20 | — |
| NCF800 | 0.10 and under | 1.00 and under | 1.50 and under | 0.030 and under | 0.015 and under | 30.00-35.00 | 19.00-23.00 | bal. | — | 0.75 and under | 0.15-0.60 | 0.15-0.60 | — | — |
| NCF800H | 0.05-0.10 | 1.00 and under | 1.50 and under | 0.030 and under | 0.015 and under | 30.00-35.00 | 19.00-23.00 | bal. | — | 0.75 and under | 0.15-0.60 | 0.15-0.60 | — | — |
| NCF825 | 0.05 and under | 0.50 and under | 1.00 and under | 0.030 and under | 0.015 and under | 38.00-46.00 | 19.50-23.50 | bal. | 2.50-3.50 | 1.50-3.00 | 0.20 and under | 0.60-1.20 | — | — |
| NCF80A | 0.04-0.10 | 1.00 and under | 1.00 and under | 0.030 and under | 0.015 and under | bal. | 18.00-21.00 | 1.50 and under | — | 0.20 and under | 1.00-1.80 | 1.80-2.70 | — | — | through the interior of an elongated, cylindrical valve bush 7 so as to be supported. This valve bush 7 pierces through a middle portion of a bonnet 8 attached to an upper opening of the valve disc casing 1, and is supported by this bonnet 8. The bonnet 8 integrally has a cylindrical portion 9 that extends downward and opens, and the valve disc 5 is slidably inserted into this cylindrical portion 9.

When the steam valve having the above-described construction is in a fully closed condition, a forward end face of the valve disc 5 contacts the valve seat 4 and the flow of steam that enters the interior of the valve disc casing 1 from the steam inlets 2a, 2b in both side portions of the valve disc casing 1 is shut off by the contact area between the valve disc 5 and the valve seat 4. Therefore, the steam does not flow trough the steam outlet 3. Upward moving the valve disc 5 by use of the valve stem 6 brings the steam valve into an open condition, and the steam passes through a clearance formed between the valve disc 5 and the valve seat 4 and is discharged from the steam outlet 3. The valve stem 6 is actuated via an actuator (not shown) and a mechanical element that transmits the output of the actuator to the valve stem 6.

Although the steam valve shown in FIG. 1 was described here by way of example, it is needless to say that a valve gear to which the present invention is applied is not limited to the embodiment shown in FIG. 1.

The valve stem 6 and the valve bush 7 in this embodiment are made of a Ni-based superalloy. Representative materials for Ni-based superalloys are shown in Table 1 (JIS G4901). All of the materials contain Ni as a main constituent element and further contain Cr in the range of 14 to 25 wt %. Although The valve stem 6 and the valve bush 7 are both made of a Ni-based superalloy and this means that the whole valve stem 6 and the whole valve bush 7 are made of a Ni-based superalloy. Therefore, the present invention excludes an embodiment such that the base metal is made of low-alloy steels (Cr—Mo(—V) steels), 12 Cr-based stainless steels, austenite stainless steels or the like, and the building-up welding of a Ni-based superalloy is partly provided with the base metal. This is because forming the valve stem 6 or the valve bush 7 from different materials causes corrosion due to a potential difference to occur. From this point of view, it is preferred that the valve stem 6 and the valve bush 7 be made of a Ni-based superalloy of the same kind. For example, both of the valve stem 6 and the valve bush 7 are preferably made of NCF718 among the Ni-based superalloys shown in Table 1.

Next, the valve stem 6 is formed from a forged part and the valve bush 7 is formed from a cast part. A forged part and a cast part differ in some mechanical properties even if they are made of the same Ni-based superalloy. That is, in terms of mechanical strength, a forged part is superior to a cast part. In terms of vibration damping performance, a cast part is superior to a forged part.

When comparing the valve stem 6 with the valve bush 7, the valve stem 6 actuated by an actuator is required to have higher mechanical strength. Hence the present invention forms the valve stem 6 from a forged part having higher mechanical strength.

As described above, microvibrations occur in the valve stem 6 due to steam flow and loads are given to the valve bush 7 that receives the microvibrations. Thereby corrosion becomes apt to occur in the valve bush 7. Therefore, the present invention forms the valve bush 7 from a cast part having a higher capability of damping the vibrations received from the valve stem 6. As described above, although a cast part is inferior to a forged part in mechanical strength, the level of mechanical strength required for the valve bush 7 is low compared with that of the valve stem 6 and hence the valve bush 7 can have sufficient endurance even when formed from a cast part.

The valve stem 6 and the valve bush 7 may be produced according to a general manufacturing method of Ni-based superalloy members. The valve stem 6 formed from a forged part may be obtained by preparing an ingot from a molten alloy with a prescribed composition, forging and rolling this ingot and then performing prescribed heat treatment. The valve bush 7 formed from a cast part may be obtained by filling a molten alloy with a prescribed composition into a mold having a prescribed shaped cavity, cooling the molten alloy and then performing prescribed heat treatment. Of course, in order to obtain the valve stem 6 and valve bush 7 having prescribed shapes, appropriate machining, such as cutting and polishing, may be performed.

In the valve stem 6 and the valve bush 7, the preferable surface roughness Rz (JIS B0601) of the respective sliding surfaces is 100 μm or less. This is because reducing the surface roughness of the sliding surfaces in the valve stem 6 and the valve bush 7 leads to a decrease in the working torque of the valve stem 6. The surface roughness Rz of the respective sliding surfaces is preferably 100 μm or less, more preferably 50 μm or less, and particularly preferably on the order of 10 μm. Reducing the working torque of the valve stem 6 enables a downsizing of the actuator that actuates the valve stem 6 and also enables the precise control of the valve opening.

The valve stem 6 and the valve bush 7 may be subjected to a surface treatment, such as nitriding treatment, carburizing treatment and carbonitriding treatment. Such the surface treatment improves the hardness of the sliding surfaces in the valve stem 6 and the valve bush 7 and enables the abrasion amount to be reduced. For example, nitriding treatment may be performed as follows. When ammonium gas ($NH_3$) is heated to 500 to 520° C., part of the gas is separated into nitrogen (N) and hydrogen (H), and the nitrogen combines with elements in a member to be nitrided to form hard nitrides. Examples of elements that combine with nitrogen include titanium (Ti), aluminum (Al), chromium (Cr) and molybdenum (Mo) and, as shown in Table 1, many Ni-based superalloys contain these elements.

In the carburizing treatment, the carbon content of a surface layer of a member is increased and only the surface layer is quenched and hardened. In the carbonitriding treatment, carbon and nitrogen are caused to simultaneously infiltrate into a surface of a member at temperatures of 800° C. or higher.

Although both of the valve stem 6 and the valve bush 7 are made of a Ni-based superalloy in the present embodiment, the friction coefficient (dry friction) of Ni-based alloys used in contact relation is on the order of 0.50. In this connection, although the valve stem 6 and the valve bush 7 can be made of a Co-based superalloy capable of preventing the generation of an oxide film (for example, Stellite (registered trade name of Deloro Stellite Company), the working torque of the valve stem 6 increases because the friction coefficient of Co-based alloys used in contact relation is as high as 0.56. Also, Co-based superalloys are difficult-to-machine materials compared with Ni-based superalloys. Furthermore, Co-based superalloys have the drawback that the cost of Co, which is a main constituent element of Co-based superalloys, is higher than that of Ni, and with the wild ups and downs. Also from the above-described viewpoints, Ni-based superalloys are preferable to use among several superalloys.

In the steam valve of this embodiment, any material may be used for portions except the valve stem 6 and the valve bush 7. The portions except the valve stem 6 and the valve bush 7 may be made of a Ni-based superalloy as in the valve stem 6 and the valve bush 7 and may be made of low-alloy steels (Cr—Mo(—V) steels), 12 Cr-based stainless steels, austenite stainless steels or the like.

EXAMPLE

Figure 2:
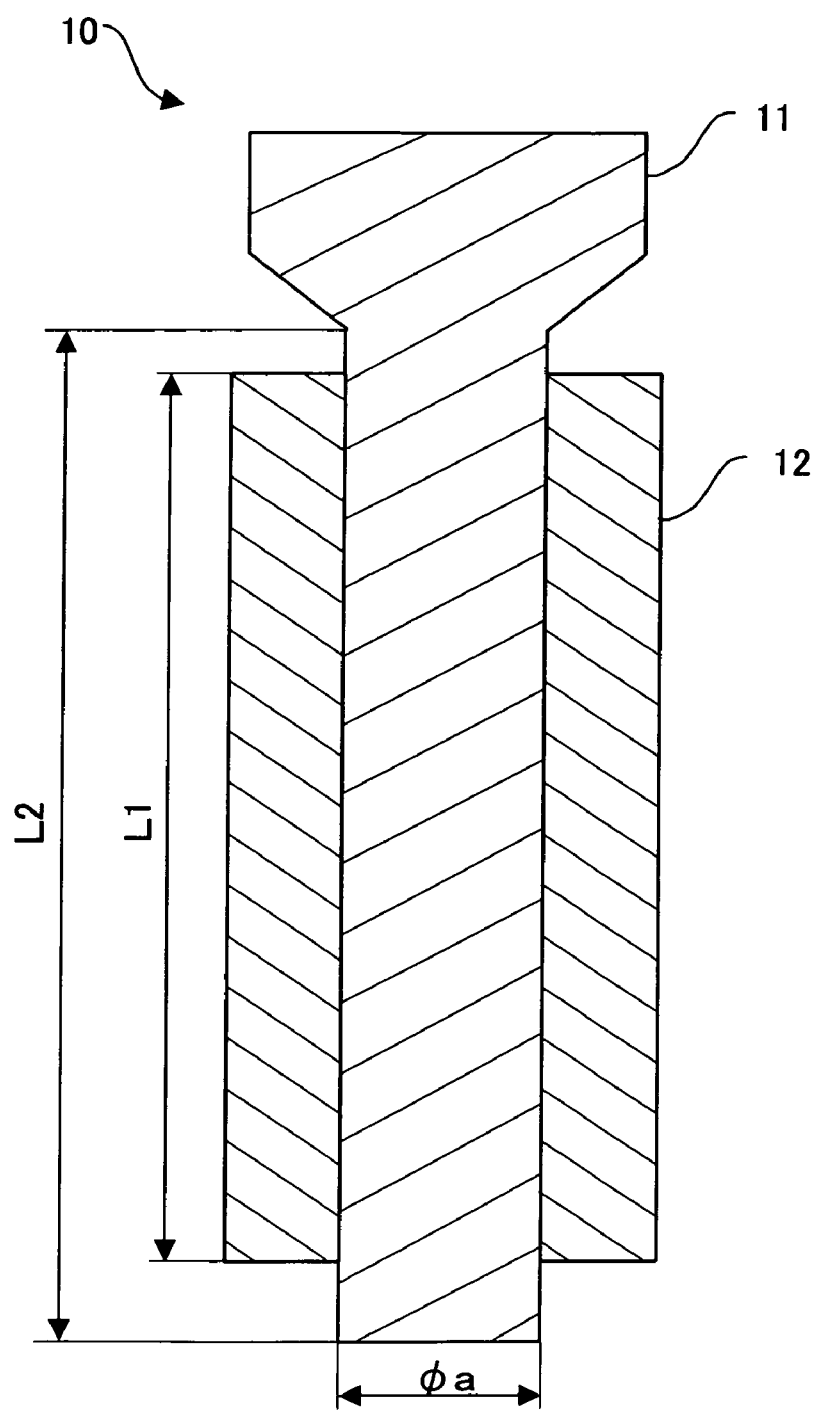
FIG. 2 is a cross-sectional view showing the construction of a test member used in an example.

A test member 10 shown in FIG. 2 was prepared. A high-temperature corrosion test was conducted by subjecting this test member 10 to an environment in which high-temperature steam (approximately 593° C.) flows. This test member 10 is composed of a simulated valve stem 11 corresponding to the valve stem 6 shown in FIG. 1 and a simulated valve bush 12 corresponding to the valve bush 7 shown in FIG. 1. Incidentally, in FIG. 2, φa=20 mm, L1=90 mm, L2=100 mm. The clearance between the outer diameter of the simulated valve stem 11 and the simulated valve bush 12 was set at 0.02 mm.

The following four test members 10 were prepared by changing materials for the simulated valve stem 11 and the simulated valve bush 12.

No. 1 Simulated valve stem 11: a forged part made of NCF718 (the composition of NCF718 is shown below; ditto for the following)
Simulated valve bush 12: a cast part made of NCF718

No. 2 Simulated valve stem 11: a forged part made of NCF718
Simulated valve bush 12: a forged part made of NCF718

No. 3 Simulated valve stem 11: a forged part made of SCM435 (the composition of SCM435 is shown below; ditto for the following)
Simulated valve bush 12: a forged part made of SCM435

No. 4 Simulated valve stem 11: NCF718 is building-up welded on a sliding surface of a forged part made of SCM435
Simulated valve bush 12: NCF718 is building-up welded on a sliding surface of a forged part made of SCM435

NCF718: 52 wt % Ni-18 wt % Cr-3 wt % Mo-5 wt % Nb-0.8 wt % Ti-0.5 wt % Al—Bal.Fe

SCM435: 1.05 wt % Cr-0.22 wt % Mo-0.35 wt % C-0.25 wt % Si-0.72 wt % Mn-not more than 0.03 wt % P-not more than 0.03 wt % S-not more than 0.03 wt % Cu—Bal.Fe Because residual stress affects corrosion, residual stress was relieved in each of the members by performing heat treatment suited to the machining of each of the members.

The powder building-up welding of NCF718 was performed by plasma powder building-up welding and a building-up welded layer having a thickness of 1.5 mm was formed.

An outer peripheral surface (a sliding surface) of the simulated valve stem 11 and an inner circumferential surface (a sliding surface) of the simulated valve bush 12 were each polished so that the surface roughness of the surfaces became 200 μm in units of Rz.

In the high-temperature corrosion test, each of the above-described test members 10 was exposed for 36 months to an environment in which high-temperature steam (approximately 593° C.) flows. On that occasion, at intervals of six hours, the simulated valve stem 11 was caused to reciprocate in its length direction relative to the simulated valve bush 12.

The stroke of this reciprocation is 50 mm. After the high-temperature corrosion test, the simulated valve stem 11 was rotated, with the simulated valve bush 12 kept in a fixed condition, and the torque necessary for the rotation (working torque) was measured. After the measurement of the working torque, the simulated valve stem 11 was extracted from the simulated valve bush 12, and the abrasion amount of the surface of the simulated valve stem 11 was measured. The results of the measurement are shown in Table 2. The working torque and the abrasion amount are both expressed by an index where each of the values for No. 3 is 100.

TABLE 2

| No. | Simulated Valve Stem 11 | | Simulated Valve Bush 12 | | Working Torque | Abrasion Amount |
|---|---|---|---|---|---|---|
| | Material | Process | Material | Process | | |
| 1 | NCF718 | Forging | NCF718 | Casting | 80 | 80 |
| 2 | NCF718 | Forging | NCF718 | Forging | 80 | 95 |
| 3 | SCM435 | Forging | SCM435 | Forging | 100 | 100 |
| 4 | SCM435 with building-up welding of NCF718 | Forging (SCM435) | SCM435 with building-up welding of NCF718 | Forging (SCM435) | 80 | 150 |

As shown in Table 2, No. 2 had a larger abrasion amount compared with No. 1 although the working torque of No. 2 was small. In No. 2 as a test member 10, the simulated valve bush 12 was formed from a forged part, thus it was susceptible to the affect of loads caused by vibrations of the simulated valve stem 11 due to the flow of high-temperature steam.

No. 3 had a large working torque because an oxide film was generated between the simulated valve stem 11 and the simulated valve bush 12. In No. 3, the simulated valve bush 12 was formed from a forged part, thus the abrasion amount was affected and increased by the loads caused by vibrations of the simulated valve stem 11 due to the flow of high-temperature steam.

No. 4 was provided with a building-up welded layer of NCF718 on the surface although the base metal was SCM435 and therefore, it was possible to prevent an oxide film from being generated in a contact area between the simulated valve stem 11 and the simulated valve bush 12. Thereby the working torque was reduced. However, because the simulated valve stem 11 and simulated valve bush 12 are each made of different materials, corrosion due to a potential difference occurred and the abrasion amount was large.

In contrast to the forgoing, No. 1 according to the present invention had a small working torque because the simulated valve stem 11 and the simulated valve bush 12 were both made of NCF718, which was a Ni-based superalloy in which the generation of an oxide film scarcely occurred. Furthermore, in No. 1, both of the simulated valve stem 11 and the simulated valve bush 12 were made of NCF718 and integrally formed. Therefore, No. 1 was not affected by corrosion due to a potential difference and the abrasion amount was also small.

Figure 3:
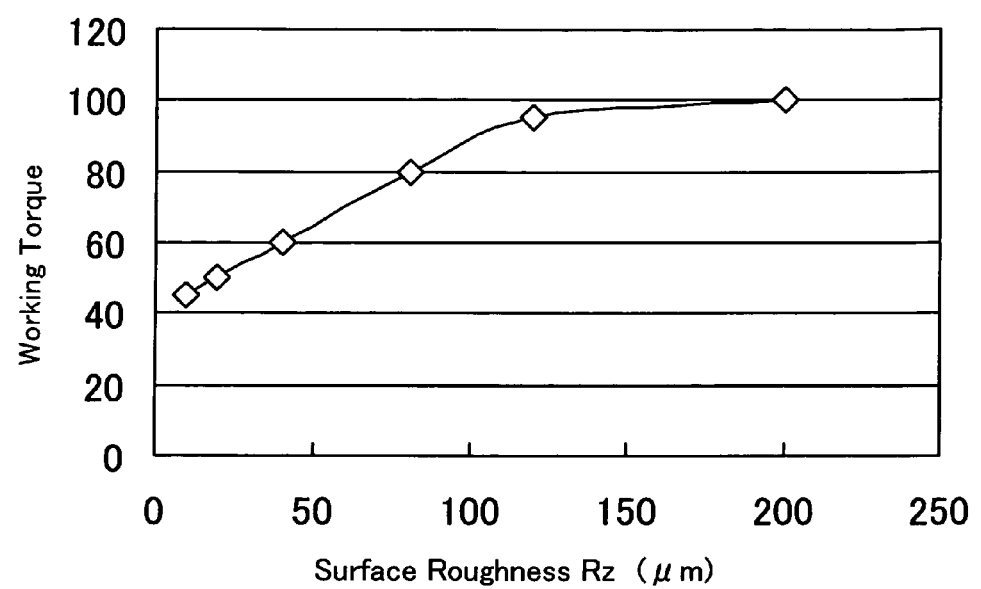
FIG. 3 is a graph showing the relationship between surface roughness Rz and working torque in the example.

Next, test members 10 similar to No. 1 shown in Table 2 were prepared with the exception that the surface roughness of the respective sliding surfaces of the simulated valve stem 11 and the simulated valve bush 12 was changed as shown in Table 3. A high-temperature corrosion test was conducted on these test members 10 as in the same manner described above and thereafter the working torque was measured for the test members. The results of the measurement are shown in Table 3 and FIG. 3. The values of working torque shown in Table 3 and FIG. 3 are expressed by an index where the value of test member 10 with surface roughness Rz of 200 μm is 100.

TABLE 3

| Surface Rroughness Rz (μm) | Working torque |
|---|---|
| 200 | 100 |
| 120 | 95 |
| 80 | 80 |

TABLE 3-continued

| Surface Rroughness Rz (μm) | Working torque |
|---|---|
| 40 | 60 |
| 20 | 50 |
| 10 | 45 |

As shown in Table 3 and FIG. 3, the working torque decreased with the decrease of the surface roughness Rz. Particularly, the working torque remarkably began to decrease when the Rz approached at approximately 100 μm. From the results, it is concluded that the preferable surface roughness of the respective sliding surfaces in both of the valve stem and the valve bush is 100 μm or less in units of Rz.

The invention claimed is:

1. A valve gear comprising:

a valve stem having a sliding surface; and a valve bush having a sliding surface, and slidably supporting said valve stem, wherein the entire valve stem is formed from a forged part made of a Ni-based superalloy, and the entire valve bush is formed from a cast part made of a Ni-based superalloy,
wherein each of a surface roughness of said sliding surface of said valve stem in contact with said valve bush and a surface roughness of said sliding surface of said valve bush in contact with said valve stem is 10 μm to 100 μm in units of Rz; and
wherein said valve stem and said valve bush are made of the same Ni-based superalloy wherein the Ni-based superalloy comprises Ni as a main constituent element and further comprises Cr in the range of 14 to 25 wt %.

* * * * *